US011888254B2

(12) United States Patent
Savina et al.

(10) Patent No.: US 11,888,254 B2
(45) Date of Patent: Jan. 30, 2024

(54) CONNECTOR ASSEMBLY COMPRISING MODULE WITH INTEGRATED TERMINAL POSITION ASSURANCE MEANS

(71) Applicant: Aptiv Technologies AG, Schaffhausen (CH)

(72) Inventors: Romain Savina, Saint Martin de Brethencourt (FR); Sylvain Loas, Louveciennes (FR); Manoharan Srinivasan, Chennai (IN); Laurent Delescluse, Saint Piat (FR)

(73) Assignee: Aptiv Technologies AG, Schaffhausen (CH)

( * ) Notice: Subject to any disclaimer, the term of this patent is extended or adjusted under 35 U.S.C. 154(b) by 113 days.

(21) Appl. No.: 17/458,690

(22) Filed: Aug. 27, 2021

(65) Prior Publication Data

US 2022/0102897 A1 Mar. 31, 2022

(30) Foreign Application Priority Data

Sep. 25, 2020 (EP) .................................... 20315420

(51) Int. Cl.
*H01R 13/42* (2006.01)
*H01R 43/18* (2006.01)

(52) U.S. Cl.
CPC ............. *H01R 13/42* (2013.01); *H01R 43/18* (2013.01); *H01R 2201/26* (2013.01)

(58) Field of Classification Search
CPC .... H01R 13/42; H01R 43/18; H01R 2201/26; H01R 13/4361; H01R 13/506; H01R 13/426; H01R 13/639; H01R 27/02; H01R 13/514; H01R 13/40; H01R 43/26
See application file for complete search history.

(56) References Cited

U.S. PATENT DOCUMENTS

| | | | | |
|---|---|---|---|---|
| 4,256,393 | A * | 3/1981 | Dietrich | G03B 15/05 396/198 |
| 6,688,908 | B2 * | 2/2004 | Wallace | H01R 24/50 439/490 |
| 7,241,052 | B2 | 7/2007 | Message et al. | |
| 9,276,345 | B2 | 3/2016 | Guillanton et al. | |
| 9,680,256 | B1 * | 6/2017 | Lane | H01R 13/6275 |
| 10,571,778 | B2 * | 2/2020 | Fujimura | G03B 17/565 |
| 10,797,427 | B2 * | 10/2020 | Dupont | H01R 13/6271 |
| 2012/0315784 | A1 | 12/2012 | Pankau | |

(Continued)

FOREIGN PATENT DOCUMENTS

| | | |
|---|---|---|
| EP | 1094561 BI | 3/2005 |
| EP | 3410540 A1 | 12/2018 |
| JP | H1021686 A | 1/1998 |

*Primary Examiner* — Abdullah A Riyami
*Assistant Examiner* — Nader J Alhawamdeh
(74) *Attorney, Agent, or Firm* — Billion & Armitage

(57) ABSTRACT

A connector assembly includes at least a first module and a second module. Each one of the first and second modules are attached together. The first module includes first terminal position assurance device for ensuring that an electrical coupling element, such as an HMTD coupler accommodated in the second module is completely inserted in its cavity formed in the second module. The first module can be replaced by another having a different number of channels, whereas the second module remains the same.

7 Claims, 5 Drawing Sheets

(56) References Cited

U.S. PATENT DOCUMENTS

| | | | | |
|---|---|---|---|---|
| 2013/0095692 | A1* | 4/2013 | Cole | H01R 13/6272 439/372 |
| 2015/0055305 | A1* | 2/2015 | Mackey | H01R 13/514 361/733 |
| 2017/0271806 | A1 | 9/2017 | Kato et al. | |
| 2017/0271815 | A1* | 9/2017 | Lane | H01R 13/641 |
| 2020/0153144 | A1* | 5/2020 | Dupont | H01R 13/426 |
| 2020/0153148 | A1* | 5/2020 | Annequin | H01R 13/641 |
| 2022/0102897 | A1* | 3/2022 | Savina | H01R 13/426 |

* cited by examiner

CONNECTOR ASSEMBLY COMPRISING MODULE WITH INTEGRATED TERMINAL POSITION ASSURANCE MEANS

CROSS-REFERENCE TO RELATED APPLICATION

This application claims benefit of priority to European Patent Application No. 20315420.8 filed in the European Patent Office on Sep. 25, 2020, the entire disclosure of which is hereby incorporated by reference.

TECHNICAL FIELD OF THE INVENTION

The present application relates in general to the field of automotive connectors and more particularly to a connector assembly including module with integrated terminal position assurance device.

BACKGROUND

It may be useful to have available mixed connectors for connecting electrical wires transmitting various kind of electrical signals and/or power levels. To this aim, very often, connectors include a single-piece housing including cavities of various sizes and/or configuration for accommodating electrical terminals having different sizes or shapes. If for various applications, there is a need for different numbers of channels, and/or for different tolerances depending on the required performances, etc., connector housings have to be developed specifically for each application. This increases the number of references to be manufactured and managed.

For example, a connector housing may have one region with one channel dedicated to HMTD transmission (where HMTD stands for "High-Speed Modular Twisted-Pair Data"), and another region having either two, four, or six, etc channels dedicated to the transmission of standard signals. HMTD transmission requires very tight tolerances, usually tighter than those required for the transmission of standard signals. Consequently, a housing has to be specifically developed and manufactured with tight tolerances for connectors having, for example, one HMTD channel and two standard channels. Another housing has to be specifically developed and manufactured with tight performances for connectors having one HMTD channel and four standard channels, etc. This negatively impacts the prices of these kinds of connectors.

Further, connectors may be equipped with TPA devices (TPA stands for "Terminal Position Assurance") and/or CPA devices (CPA stands for "Connector Position Assurance"). This also increases the number of parts to be manufactured and managed. This also negatively impacts the prices of connectors.

SUMMARY

This disclosure aims at contributing to mitigate, at least partially, problems such as those mentioned above, encountered with connectors of the prior art.

The present disclosure relates to a connector assembly including various modules, at least two of which accommodate different connection configurations (i.e., different type of terminals). For example, one module can be designed for an HMTD transmission whereas another module can be designed for a standard transmission of electrical signals or for a standard supply of power. According to another example, the connector assembly includes a module for the supply of electrical power, whereas another module is designed for a standard transmission of electrical signals, etc. According to another example, the features and advantages disclosed in this document in connection with two modules, can be derived for an assembly of more than two modules. This disclosure also relates to a set of connector modules wherein at least two connector modules are designed to be assembled together, one of these two connector modules being interchangeable with another connector module of this set of connectors. This disclosure also relates to method for manufacturing a connector assembly.

The connector assembly of the present disclosure allows managing various types of connections with different modules. For example, a module can be designed for HMTD transmission and other modules can be designed each for the transmission of standard signals along two, four, six, etc. channels. The module designed for HMTD transmission can meet tighter tolerance requirements than the modules designed for standard transmission. The design, the tolerances and the performances of the module designed for HMTD transmission remain the same, whereas the modules designed for standard transmission is interchangeable according to the required number of standard transmission channels.

The connector assembly of the present disclosure also allows using a first material for a first module and another material for a second module. For example, a first moulding material, e.g., 30% glass filled polybutylene terephthalate (PBT) can be used to manufacture the housing of the first module and a second moulding material, e.g., 30% glass filled PBT or 30% glass filled polyamide (PA66), can be used to manufacture the housing of the second module.

Further, a TPA device are integrated in one of the modules for controlling the terminal position of another module. Two elements (usually made as one module housing and one separate TPA device, in the prior art connector assemblies), are made as one part (i.e., one piece) in the disclosed connector assembly.

The disclosure also relates to a set of connector modules and a method for manufacturing a connector assembly.

BRIEF DESCRIPTION OF THE DRAWINGS

The present invention will now be described, by way of example with reference to the accompanying drawings, in which.

DETAILED DESCRIPTION

In this document, the terms "top", "bottom", etc., are purely conventional and refer, where applicable, to the orientations as depicted in the figures.

In the figures, the same references denote elements that are identical or similar.

In this document, an "electrical coupling element" designates an element mechanically linked to an electrical cable and which can be coupled to a counterpart element for an electrical connection. For example, an electrical coupling element may be a male or a female terminal made of a conductive metal electrically connected to an electrical wire or cable and which is adapted for mating with a counterpart terminal. An electrical coupling element may also be a coupler mechanically maintaining terminals electrically and mechanically linked to an electrical wire or cable. For example, an HMTD coupler is an electrical coupling element that houses a pair of terminals linked to a pair of twisted wires forming a twisted-pair cable.

Figure 1:
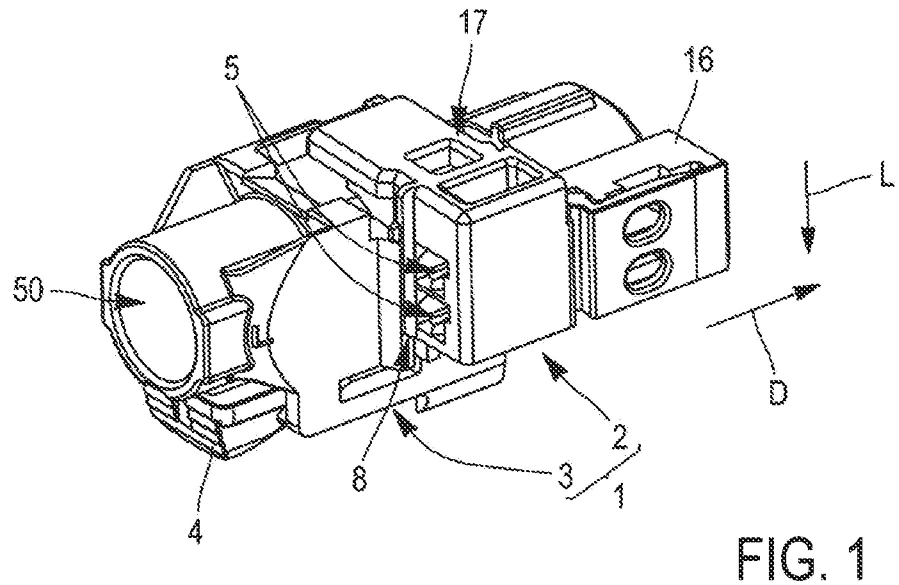
FIG. 1 is a schematic perspective view of an example of a connector assembly according to an embodiment of the present disclosure.

An example of a connector assembly 1 according to an embodiment of the present disclosure is shown in FIG. 1. This connector assembly 1 includes a first module 2, a second module 3, and a CPA device 4. The first 2 and second 3 modules are made of dielectric material(s), such as a plastic material. This connector assembly 1 also includes terminals (not shown—Made of a conductive metal or metal alloy).

In this example, the first module 2 includes two cavities 5 for accommodating each respectively an electrical coupling element. In this example, each electrical coupling element of the first module is a terminal designed for the transmission of standard electrical signals.

The second module 3 includes one cavity 50 for accommodating an electrical coupling element. This electrical coupling element is an HMTD coupler 6 (See FIGS. 10-13 for example). In this example, the HMTD coupler 6 includes a pair of terminals electrically and mechanically linked to a jacketed twisted-pair cable 7.

In FIG. 1, the first module 2 is mounted on the second module 3 in a pre-locked position. As explained below, in the pre-locked position, the first module 2 does not interfere with the HMTD coupler 6 which is accommodated in the second module 3. In the shown example, the electrical coupling elements of the first 2 and second 3 modules all extend in the same direction, i.e., a mating direction D, so that they can be mated with electrical coupling elements of a counterpart connector as if the first module 2 and the second module 3 were a single housing.

The first module 2 is attached to the second module 3 by virtue of the attaching device 8 guiding the movement of the first module 2 relative to the second module 3 along a locking direction L which is perpendicular to the mating direction D.

Figure 2:
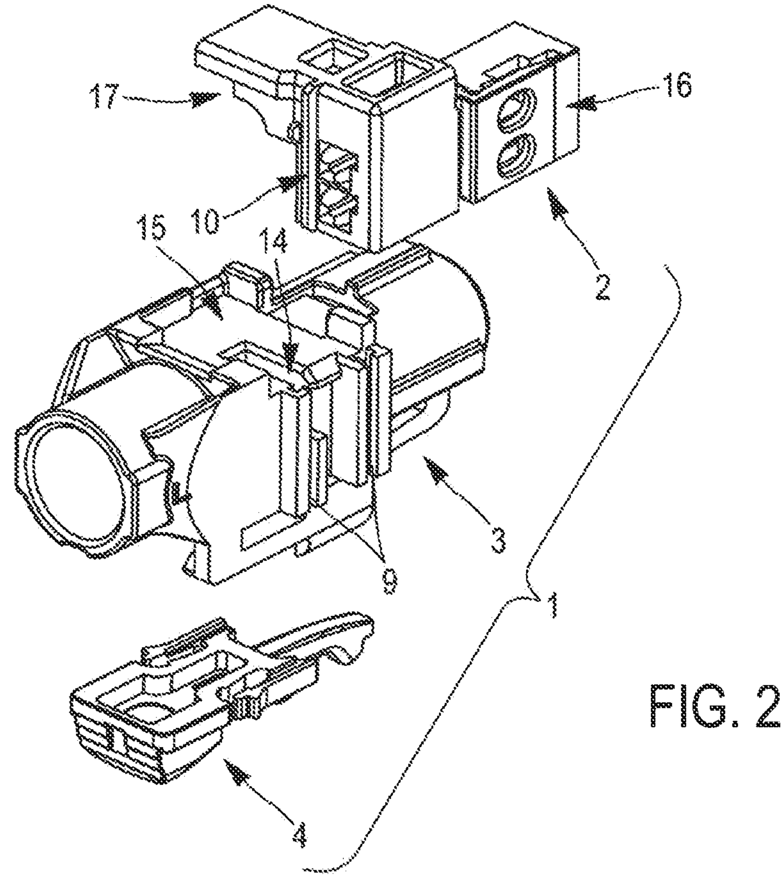
FIG. 2 is an exploded perspective view of the connector assembly shown in FIG. 1 according to an embodiment of the present disclosure.
Figure 3:
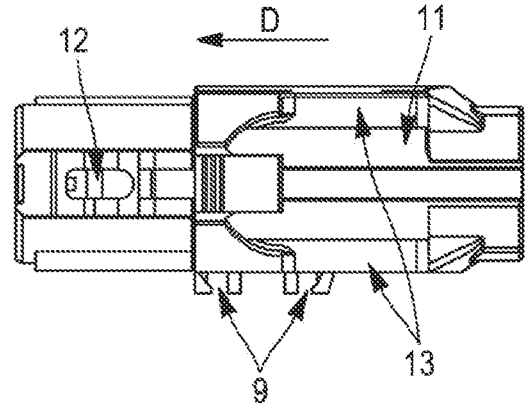
FIG. 3 is a schematic elevation view (from the bottom) of a module of the connector assembly shown in FIGS. 1 and 2 according to an embodiment of the present disclosure.
Figure 4:
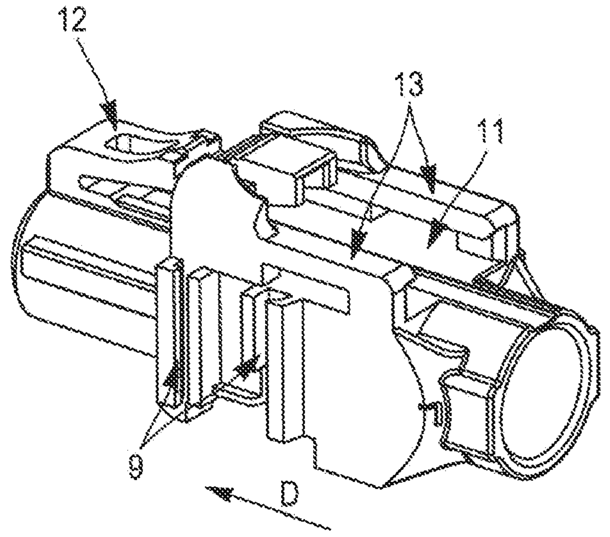
FIG. 4 is schematic perspective view (from the bottom) of the module shown in FIG. 3 according to an embodiment of the present disclosure.
Figure 5:
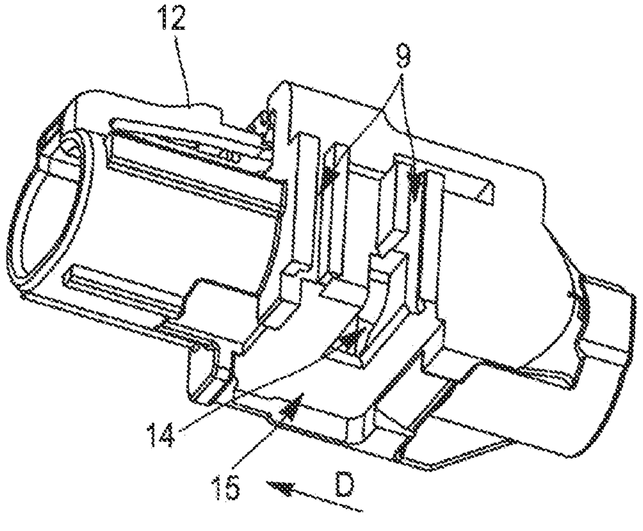
FIG. 5 is another schematic perspective view (from the top) of the module shown in FIGS. 3 and 4 according to an embodiment of the present disclosure.
Figure 6:
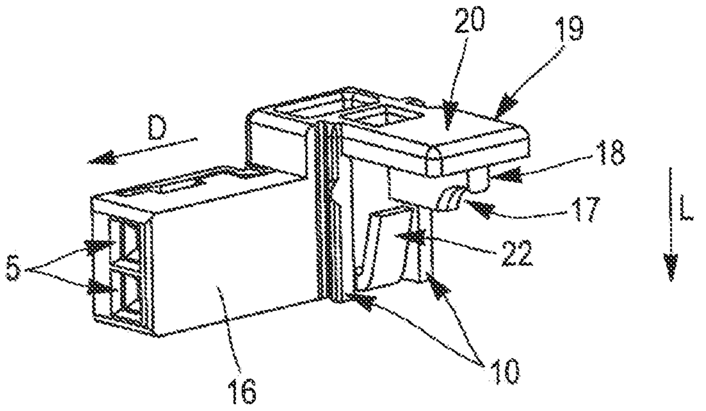
FIG. 6 is a schematic perspective view of the other module of the connector assembly shown in FIGS. 1 and 2 according to an embodiment of the present disclosure.

An exploded view of the connector assembly 1 of FIG. 1 is shown in FIG. 2. In this example, the attaching device 8 includes two grooves 9 on the first module 2 and two ribs 10 on the second module 3, each one of the ribs 10 engaging a respective groove 9 (of course according to variations, the grooves would be on the second module 3 and the ribs would be on the first module 2, or one groove would be on the first module and one groove would be on the second module, whereas one rib would be on the first module and one rib would be on the second module, the number of ribs and groove may also vary). The grooves 9 are parallel to each other and parallel to the locking direction L (see also FIGS. 3 to 5). The ribs 10 are parallel to each other and parallel to the locking direction L (see also FIGS. 6 to 8).

The second module 3 has a generally elongated shape extending along the mating direction D. The housing of the second module 3 includes a bottom face 11 (See FIGS. 3 and 4). This bottom face 11 supports a latch 12 and a guiding device 13 for maintaining and guiding the CPA device 4, along the mating direction D, between a pre-locked position and a locked position. The latch 12 is flexible and engages a locking device located on a mating counterpart (not shown), when the second module 3 is fully mated with this mating counterpart. In its pre-locked position, the CPA device 4 allows the mating of the second module 3 with the mating counterpart, and the CPA device 4 does not lock the latch 12. In its locked position, the CPA device 4 engages the latch 12 to prevent the latch 12 from being released from the locking device of the mating counterpart. The CPA device 4 can be moved from its pre-locked position to its locked position only if the second module 3 is fully mated with the mating counterpart. For un-mating the second module 3 and the mating counterpart, the CPA device 4 is first moved backward in a direction opposite to the mating direction D, and second, the latch 12 can be actuated for freeing the second module 3 from the mating counterpart.

The second module 3 also includes a slot 14 extending essentially parallel to a plane perpendicular to the mating direction D. The slot 14 makes an opening communicating through the second module wall, between the external surface of the top face 15 of the second module 3 and the internal surface of the cavity 50 of the second module 3.

The first module 2 is generally L-shaped. The first module 2 has a mating portion 16 extending longitudinally parallel to the mating direction D and a locking portion 17 extending essentially perpendicular to the mating direction D (see FIGS. 6-8). The mating portion 16 includes two cavities 5 in each one of which a terminal is accommodated. The locking portion 17 includes a locking wall 18 and an actuation wall 19. The locking portion 17 is designed and adapted to slide into the slot 14. The actuation wall 19 presents a pushing surface 20 perpendicular to the locking direction L. When an operator pushes on the pushing surface 20, the attaching device 8 guides the movement of the first module 2 relatively to the second module 3, along the locking direction L. During this movement, the second module 3 is moved along the attaching device, first in order to be mounted on the second module 3 and second between a pre-locked position and a locked position.

Figure 9:
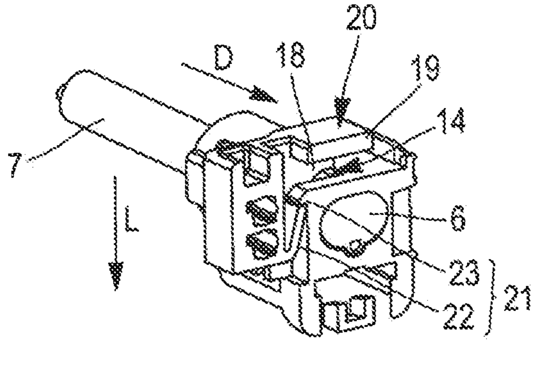
FIG. 9 is a schematic cross section of the connector assembly shown in FIGS. 1 and 2 according to an embodiment of the present disclosure.
Figure 10:
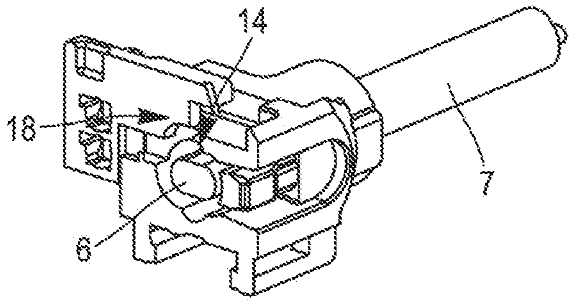
FIG. 10 is another schematic cross section of the connector assembly shown in FIGS. 1 and 2, the first module being in a pre-locked position according to an embodiment of the present disclosure.
Figure 11:
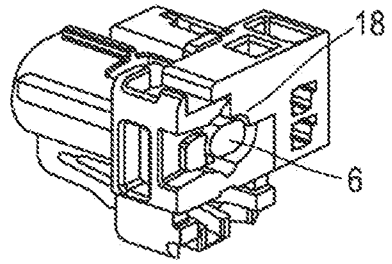
FIG. 11 is another schematic cross section of the connector assembly shown in FIGS. 1 and 2, the first module being in a locked position according to an embodiment of the present disclosure.
Figure 12:
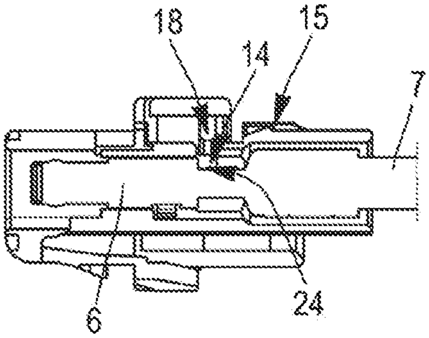
FIG. 12 is a schematic longitudinal cross section of the connector assembly shown in FIGS. 1 and 2, the first module being in a pre-locked position according to an embodiment of the present disclosure.
Figure 13:
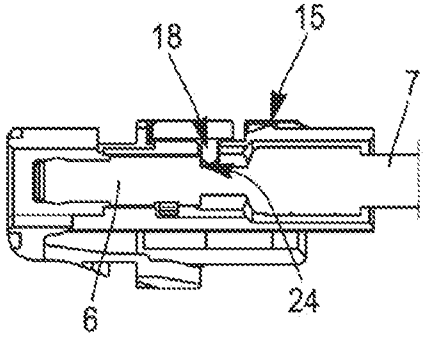
FIG. 13 is a schematic longitudinal cross section of the connector assembly shown in FIGS. 1 and 2, the first module being in a locked position according to an embodiment of the present disclosure.

The first module 2 is secured to the second module 3 by virtue of the first locking device 21. The first locking device 21 includes for example an elastic blade 22 and a blocking tooth 23 (See FIG. 9). As described below, the first locking device 21 may also include teeth that block the movement of the first module 2 along the locking direction L, in the pre-locked position. The elastic blade 22 extends between a hinge located on the housing of the first module 2 and a free end. The blocking tooth 23 is located on the housing of the second module 3. The elastic blade 22 deforms when the first module 2 is mounted on the second module 3 and springs back behind the blocking tooth 23 when the first module 2 is in the pre-locked position, to prevent the first module 2 from moving in a direction opposite to the locking direction L and from being inadvertently removed from the second module 3.

In the pre-locked position, the locking wall 18 of the locking portion 17 does not obstruct the cavity 50 of the second module 2 (in any case, if the locking wall 18 obstructs at least partially the cavity 50, the obstruction is not sufficient for interfering with the HMTD coupler 6 when the latter is inserted into the cavity 50). Consequently, an electrical coupling element such as an HMTD coupler 6 can be freely inserted in, or removed, from this cavity 50.

In the locked position, the locking wall 18 of the locking portion 17 obstructs partially the cavity 50 of the second module 3. If an electrical coupling element such as an HMTD coupler 6 is completely and properly inserted into the cavity 50 of the second module 3, the locking wall 18 engages a shoulder 24 (or more generally a stop or a blocking surface) of the electrical coupling element, to prevent the electrical coupling element from being withdrawn from the cavity 50 of the second module 3.

If the electrical coupling element is not completely and properly inserted in the cavity 50, the locking wall 18 interferes with the main body of the electrical coupling element and the first module 2 cannot be moved completely towards its locked position. Consequently, the locking portion 17 forms a first terminal position assurance device. Since the locking portion 17 is a portion of the first module 2, one may consider that the first module 2 itself ensures a terminal position assurance function.

Figure 7:
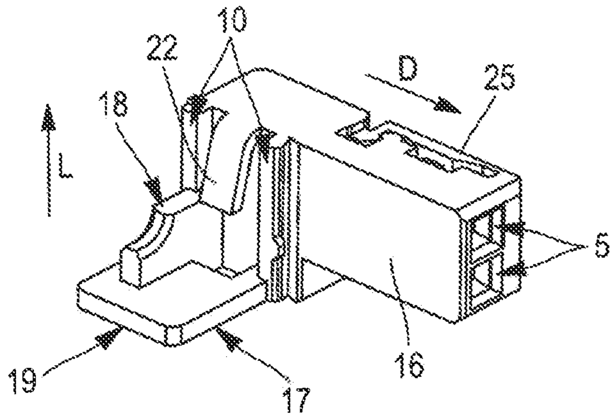
FIG. 7 is a schematic perspective view of the module of FIG. 6, seen from another angle according to an embodiment of the present disclosure.
Figure 8:
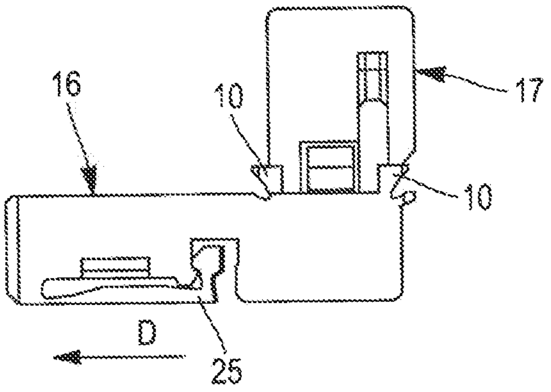
FIG. 8 is a schematic elevation view of the module of FIGS. 6 and 7 according to an embodiment of the present disclosure.

As illustrated in FIG. 7, the first module 2 also includes second terminal position assurance (TPA) device 25 for ensuring that each electrical coupling element accommodated in the first module 2 is completely inserted into its respective cavity 5.

Figure 14:
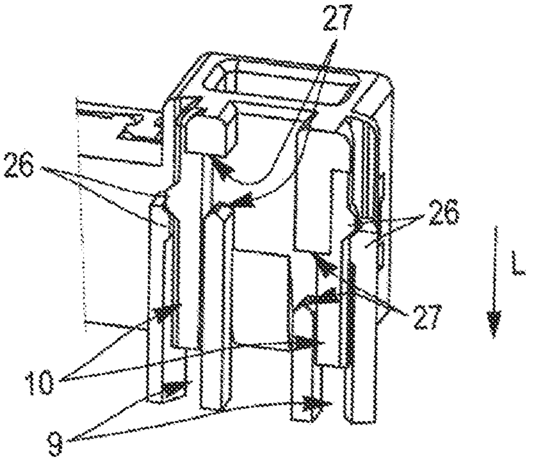
FIG. 14 is another schematic cross section of the connector assembly shown in FIGS. 1 and 2, the first module being in a pre-locked position according to an embodiment of the present disclosure.
Figure 15:
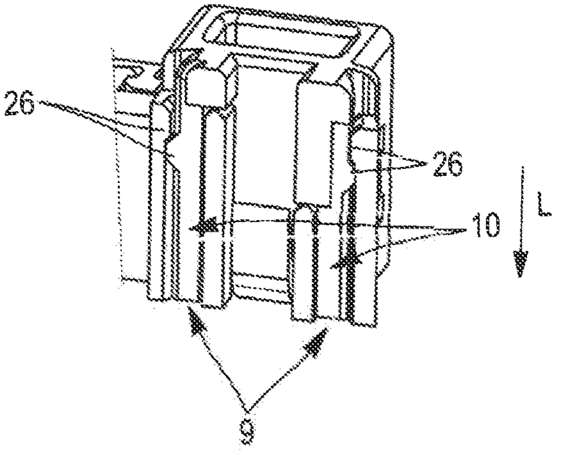
FIG. 15 is another schematic cross section of the connector assembly shown in FIGS. 1 and 2, the first module being in a locked position according to an embodiment of the present disclosure.

As shown in FIGS. 14 and 15, in the pre-locked position, first surfaces of teeth 26 respectively located in the grooves 9 and on the ribs 10 interferes with each other to contribute with the first locking device 21 including the elastic blade 22 and blocking tooth 23, to block the first module 2 in its pre-locked position. Indeed, these first surfaces engage each other to prevent a movement of the first module 2 relative to the second module 3 along the locking direction L, toward the locked position. In the pre-locked position, in order to further move the first module 2 relative to the second module 3 along the locking direction L toward the locked position, it is necessary to push a bit harder on the pushing surface 20 so as to overcome a strength level. Then, the grooves 9 and ribs 10 deform, the teeth 26 escape each other and the first module 2 slides toward its locked position.

The first module 2 is blocked in the locked position by the second surfaces of the teeth 26. A movement opposite the locking direction L s blocked by these second surfaces of the teeth 26, but the movement of the first module 2 is also blocked in the locking direction L by stop surfaces 27 respectively located on the first 2 and second 3 modules. These stop surfaces 27 are essentially perpendicular to the locking direction L. These stop surfaces 27 also contribute, with the second surfaces of the teeth 26, to form second locking device. The first module 2 is precisely positioned in the locked position by virtue of the teeth 26 on the one hand, and the stop surfaces 27 on the other hand. Consequently, the HMTD coupler (or more generally an electrical coupling element accommodated in the cavity 50 of the second module 3) is also precisely and firmly maintained in the cavity 50. Tight tolerances can be achieved.

When the first module 2 is attached to the second module 3, in the locked position, the first 2 and second 3 modules form an assembly that can be operated as if this assembly is equivalent to a single piece. This assembly can be mated to a counterpart connector and the CPA device 4 is moved from a pre-locked position to a locked position, for ensuring that both the first 2 and second 3 modules are completely mated to the counterpart connector.

Figure 16A:
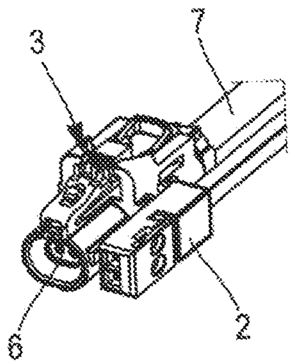
FIGS. 16A-16C show schematic perspective views of three examples of connector assemblies according to embodiments of the present disclosure, with a first module corresponding respectively to two, four, and six channels according to an embodiment of the present disclosure.
Figure 16B:
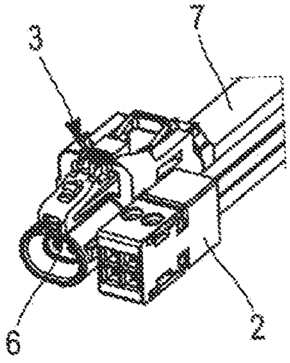
Figure 16C:
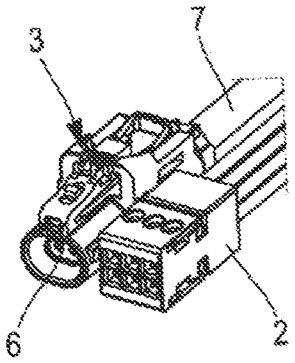

As illustrated in FIGS. 16A-16C, while the second module 3 can be kept the same, various first modules 2 can be mounted on the second module 3. For example, the first module 2 can be configured for two channels (see FIG. 16A), four channels (see FIG. 16B), and six channels (see FIG. 16C). In other words, sets of connector modules 2, 3 can be manufactured, and possibly sold, wherein a first module 2 of a first connector assembly has a number of cavities 5 different from the number of cavities 5 of a second connector assembly, whereas the second module 3 of the first connector assembly is identical to the second module 3 of the second connector assembly.

It has been depicted a connector assembly 1 including a second module 3 having only one cavity 5 for accommodating a HMTD coupler 6. Of course, the above teaching can be easily used for conceiving connector assemblies including a second module having more cavities for accommodating HMTD couplers.

The invention claimed is:

1. A connector assembly, comprising:

a first module; and a second module, wherein each one of the first and second modules have at least one cavity configured for accommodating an electrical terminal, the first and the second modules comprising an attaching device for attaching the first module and the second module together, wherein the first module comprises a first terminal position assurance device configured to ensure that each electrical terminal accommodated in the second module is completely inserted in its respective cavity.

2. The connector assembly according to claim 1, wherein the first module is movable along a locking direction between a pre-locked position, wherein the first terminal position assurance device does not engage at least one electrical terminal inserted in the second module and a locked position, wherein the first terminal position assurance device engages and locks the at least one electrical terminal in a position completely inserted in the second module and wherein the attaching device guides a movement along the locking direction of the first module relatively to the second module.

3. The connector assembly according to claim 2, wherein the first and second modules comprise first locking device for locking the first and second modules in the pre-locked position and second locking device for locking the first and second modules in the locked position.

4. The connector assembly according to claim 1, wherein the first module comprises second terminal position assurance device for ensuring that each electrical terminal accommodated in the first module is completely inserted in its respective cavity.

5. The connector assembly according to claim 1, wherein the second module comprise a connector position assurance device, slidingly movable between a pre-locked position and a locked position, for ensuring that both the first and second modules are completely mated to a counterpart connector.

6. A set of connector modules, comprising:

at least two connector assemblies according to claim 1, wherein the first module of a first connector assembly has a number of cavities different from a number of cavities of a second connector assembly and wherein the second module of the first connector assembly is identical to the second module of the second connector assembly.

7. A method of manufacturing a connector assembly, comprising the steps of:

providing a first module and a second module, wherein each one of the first and second modules has at least one cavity for accommodating an electrical terminal, mounting the first and second modules together, completely inserting at least one electrical terminal in a cavity of the second module, wherein the first module comprises a first terminal position assurance device and the first module is pushed in a locked position, wherein the first terminal position assurance device locks the electrical terminal completely inserted in the cavity of the second module, and wherein the first module is attached and locked onto the second module.

* * * * *